United States Patent
Kang et al.

(10) Patent No.: US 10,372,469 B2
(45) Date of Patent: Aug. 6, 2019

(54) METHOD AND DEVICE FOR DISPLAYING INFORMATION

(71) Applicant: Beijing Xiaomi Mobile Software Co., Ltd., Beijing (CN)

(72) Inventors: Shangmingxue Kang, Beijing (CN); Fang Liu, Beijing (CN); Peng Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 159 days.

(21) Appl. No.: 15/482,857

(22) Filed: Apr. 10, 2017

(65) Prior Publication Data

US 2017/0315681 A1    Nov. 2, 2017

(30) Foreign Application Priority Data

Apr. 29, 2016 (CN) .......................... 2016 1 0285269

(51) Int. Cl.
| | |
|---|---|
| *G06F 3/048* | (2013.01) |
| *G06F 16/00* | (2019.01) |
| *G06F 9/00* | (2006.01) |
| *G06F 9/451* | (2018.01) |
| *G06F 3/0482* | (2013.01) |
| *G06F 3/0483* | (2013.01) |
| *G06F 16/9535* | (2019.01) |

(52) U.S. Cl.
CPC ............ *G06F 9/451* (2018.02); *G06F 3/0482* (2013.01); *G06F 3/0483* (2013.01); *G06F 9/454* (2018.02); *G06F 16/9535* (2019.01)

(58) Field of Classification Search
CPC . G06F 3/048; G06F 17/00; G06F 9/00; G06F 16/00; G06F 3/00
See application file for complete search history.

(56) References Cited

U.S. PATENT DOCUMENTS

| | | | |
|---|---|---|---|
| 2012/0180111 A1* | 7/2012 | Velasco | G06F 21/62 726/4 |
| 2014/0013251 A1* | 1/2014 | Zafar | G06F 17/218 715/760 |
| 2014/0129957 A1* | 5/2014 | Chou | G06F 3/0482 715/747 |

(Continued)

FOREIGN PATENT DOCUMENTS

| | | |
|---|---|---|
| CN | 101958968 A | 1/2011 |
| CN | 102968469 A | 3/2013 |

(Continued)

OTHER PUBLICATIONS

Extended European Search Report in European application No. 17159829.5, dated Oct. 6, 2017.

(Continued)

*Primary Examiner* — Hugo Molina
(74) *Attorney, Agent, or Firm* — Finnegan, Henderson, Farabow, Garrett & Dunner LLP

(57) ABSTRACT

A method for displaying information includes receiving a preset operation, the preset operation being configured to instruct a terminal to display a preset desktop page; acquiring a parameter of an environment in which the terminal is located; predicting a service to be called by a user according to the parameter; and displaying information of the service in the preset desktop page.

18 Claims, 8 Drawing Sheets

(56) References Cited

U.S. PATENT DOCUMENTS

| | | | | |
|---|---|---|---|---|
| 2014/0359502 A1* | 12/2014 | Yoon | ............... | G06F 3/04817 715/766 |
| 2015/0208205 A1* | 7/2015 | Chan | ............... | G06F 16/125 709/217 |
| 2015/0347912 A1* | 12/2015 | Rodzevski | ............... | G01P 15/02 706/11 |
| 2016/0239547 A1* | 8/2016 | Lim | ............... | G06F 3/04842 |
| 2016/0350136 A1* | 12/2016 | Karlo | ............... | G06F 3/04842 |

FOREIGN PATENT DOCUMENTS

| | | |
|---|---|---|
| CN | 103092888 A | 5/2013 |
| CN | 103248658 A | 8/2013 |
| CN | 104182515 A | 12/2014 |
| CN | 105630907 A | 6/2016 |

OTHER PUBLICATIONS

Conner Carey, "How to Use the New, Improved Spotlight Search", dated Apr. 22, 2016, Retrieved from the Internet: URL: https://www.iphonelife.com/content/how-use-new-improved-spotlight-feature-ios-9, retried on Sep. 13, 2017.

MacRumors, "Here's a look at iOS 9's new 'Proactive' Search and Siri features", Youtube, dated Jun. 15, 2016, retrieved from the Internet: YouTube, URL: https://www.youtube.com/watch?v=7ZxjsXM_Qso, retrieved on Sep. 11, 2017.

Richard Forsythe, "Spotlight Search on IOS9 Explained-Toptal: Demistifying iOS 9 Spotlight Search for Developers", dated Dec. 9, 2015, 8 pages, retrieved from the Internet: URL: htttps://www.toptal.com/ios/ios-9-spotlight-search-for-developers, retrieved on Sep. 13, 2017.

Anonymous, "Introduction to Proactive Suggestions", dated Apr. 15, 2015, 24 pages, retrieved from the Internet: URL: https://developer.xamarin.com/guides/ios/platform_features/search/proactive-suggestions/, retrieved on Sep. 13, 2017.

Joshua Huerkamp, "iOS 9 Tutorial Series: Search API", dated Sep. 15, 2015, 3 pages, retrieved from the Internet: URL: https://www.captechconsulting.com/blogs/ios-9-tutorial-series-search-api, retrieved on Sep. 12, 2017.

Office Action in counterpart Chinese Application No. 201610285269.8, dated Aug. 29, 2018.

* cited by examiner

METHOD AND DEVICE FOR DISPLAYING INFORMATION

CROSS-REFERENCE TO RELATED APPLICATION

This application is based upon and claims priority to Chinese Patent Application No. 201610285269.8, filed Apr. 29, 2016, the entire contents of which are incorporated herein by reference.

TECHNICAL FIELD

The present disclosure generally relates to the field of computers technology, and more particularly to, a method and a device for information display.

BACKGROUND

Terminals tend to be developed into close assistants of people, and may use life patterns and preferences of people to provide valuable service for users at the right time.

An information display method provided by conventional related technologies may include recording by a terminal an application used by a user at a relatively high frequency, and displaying the application on a specific desktop of the terminal for the user to directly start the application on the specific desktop.

SUMMARY

According to a first aspect of the embodiments of the present disclosure, a method for information display is provided. The method includes receiving a preset operation, the preset operation being configured to instruct a terminal to display a preset desktop page; acquiring a parameter of an environment in which the terminal is located; predicting a service to be called by a user according to the parameter; and displaying information of the service in the preset desktop page.

According to a second aspect of the embodiments of the present disclosure, a terminal is provided. The terminal includes a processor, and a memory configured to store instructions executable by the processor. The processor is configured to: receive a preset operation, the preset operation being configured to instruct the terminal to display a preset desktop page; acquire a parameter of an environment in which the terminal is located; predict a service to be called by a user according to the parameter; and display information of the service in the preset desktop page.

According to a third aspect of the embodiments of the present disclosure, a non-transitory computer-readable storage medium having stored therein instructions is provided. The instructions, when executed by a processor of a terminal, cause the terminal to perform a method for information display. The method includes: receiving a preset operation, the preset operation being configured to instruct the terminal to display a preset desktop page; acquiring a parameter of an environment in which the terminal is located; predicting a service to be called by a user according to the parameter; and displaying information of the service in the preset desktop page.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
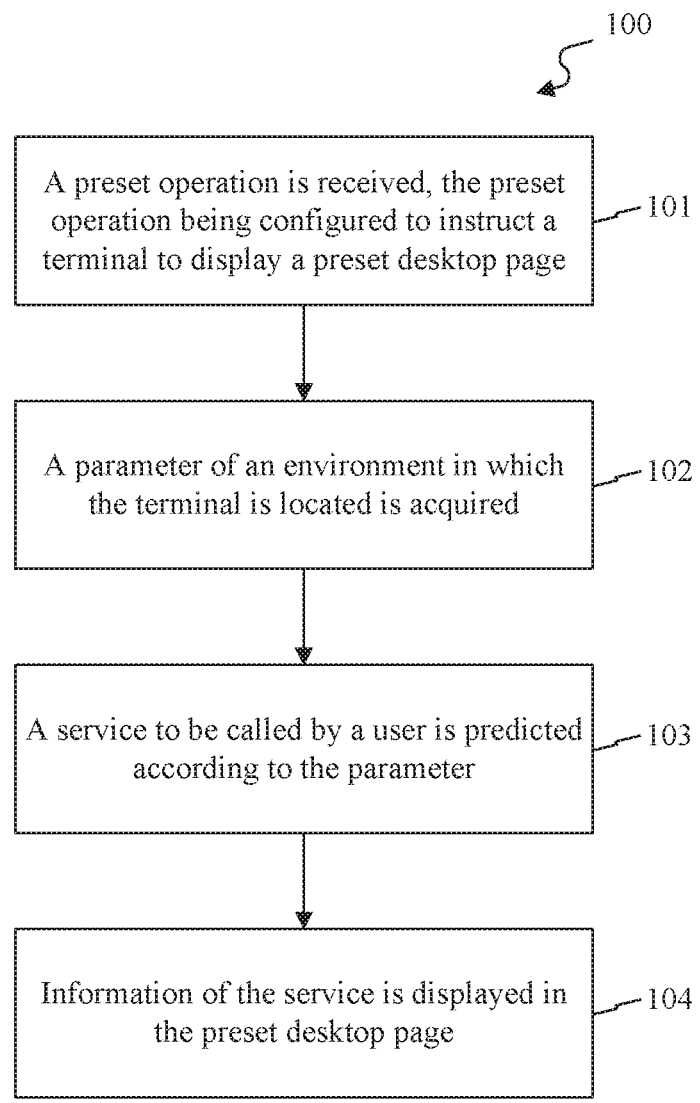
FIG. 1 is a flow chart of a method for information display according to an exemplary embodiment.

FIG. 1 is a flow chart of a method 100 for information display according to an exemplary embodiment. The method 100 may be applied to a terminal. Referring to FIG. 1. the method 100 includes the following steps.

In step 101, a preset operation is received, the preset operation being configured to instruct the terminal to display a preset desktop page.

In step 102, a parameter of an environment in which the terminal is located is acquired.

In step 103, a service to be called by a user is predicted according to the parameter.

In step 104, information of the service is displayed on the preset desktop page.

In the exemplary embodiment, the preset desktop page is a desktop created by the terminal to display the information of the service, while an ordinary desktop page is a desktop created by the terminal to display application icons. The preset desktop page is different from the ordinary desktop page. The preset desktop page may also be called a minus one screen.

The preset desktop page may be located on a left side or a right side of the ordinary desktop page, and may also be located between multiple ordinary desktop pages. In an embodiment, the preset desktop page is located on the left side of the ordinary desktop page. In this case, the preset operation may be a rightward swipe operation. When the user executes the rightward swipe operation on a current ordinary desktop page, the terminal switches from the current ordinary desktop page to an ordinary desktop page on its left side. The user may continue executing the rightward swipe operation until the terminal switches from the current ordinary desktop page to the preset desktop page on the left side.

In the method 100, the preset operation configured to instruct the terminal to display the preset desktop page is received; the parameter of the environment in which the terminal is located is acquired; the service to be called by the user is predicted according to the parameter; and the information of the service is displayed in the preset desktop page. In this way, a service that may be called by a user is recommended to the user according to usage habits of the user. Therefore, the situation that a same service is continuously and forcedly recommended to the user according to a usage frequency of the service may be avoided. Accordingly, recommendation inaccuracy of a service may be reduced. Such inaccuracy may result from the same service being continually recommended to the user according to the using frequency of the same service, while the user may call different service at different times. Thus, improving accuracy of the recommended service is achieved.

Figure 2A:
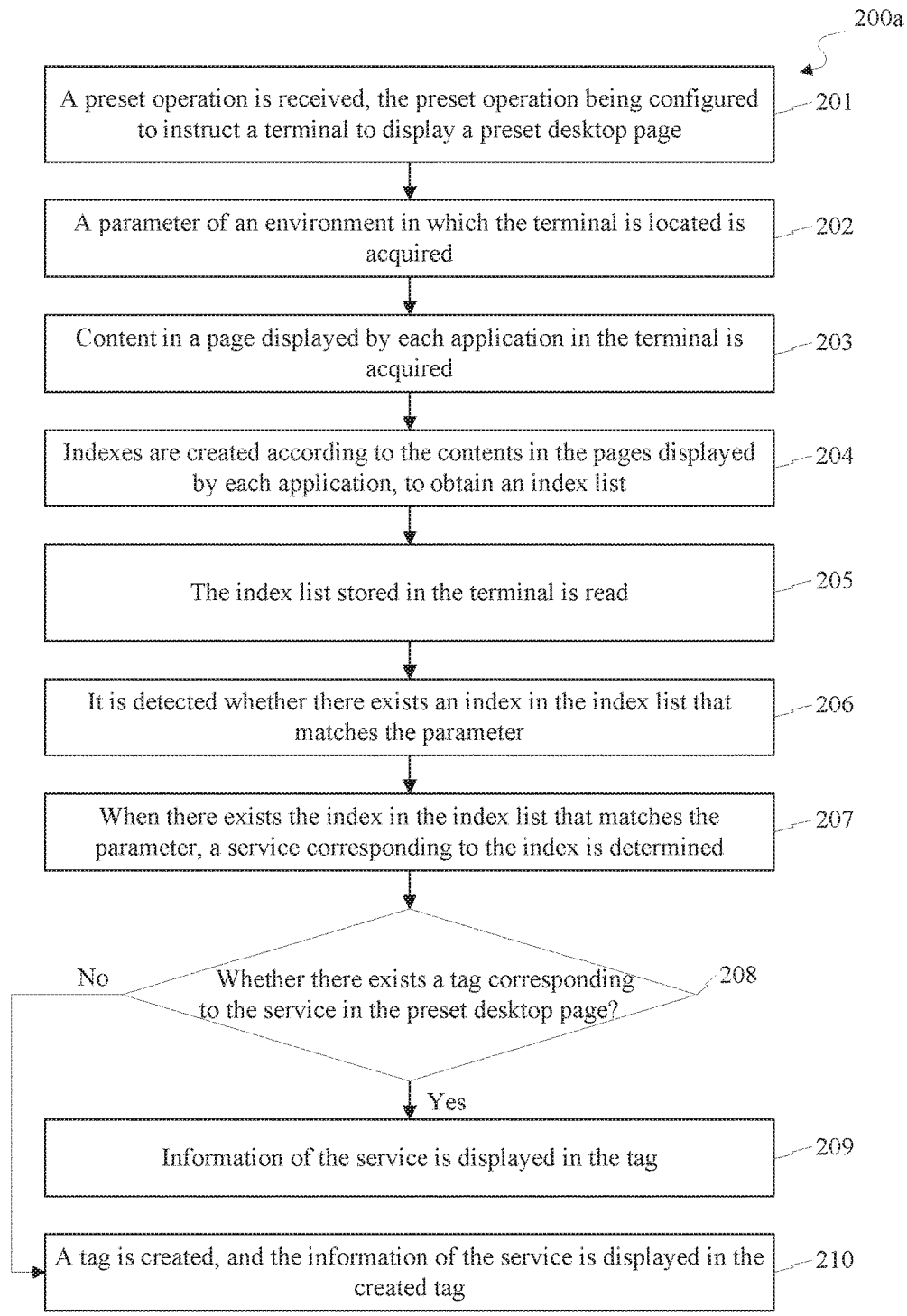
FIG. 2A is a flow chart of a method for information display according to another exemplary embodiment.

FIG. 2A is a flow chart of a method 200a for information display according to another exemplary embodiment. As shown in FIG. 2A, the method 200a includes the following steps.

In step 201, a preset operation is received, the preset operation being configured to instruct a terminal to display a preset desktop page.

The preset operation may be triggered by an action on a physical key in the terminal, may also be triggered by an action on a virtual key in the terminal, may also be triggered by an action on both the physical key and the virtual key, and may further be triggered by execution of a preset gesture on a display screen or a sensor of the terminal. There are no limits made in the embodiment.

In step 202, a parameter of an environment in which the terminal is located is acquired.

The parameter of the environment in which the terminal is currently located may include, but is not limited to, a current time, a current location, a current brightness, a current temperature or the like.

In step 203, content in a page displayed by each application in the terminal is acquired.

The terminal may acquire the contents in all the pages displayed by all the applications. For example, the user reads news with the terminal in the morning, and an intelligent assistant running on the terminal acquires content of the news; the user plays a game with the terminal at noon, and the intelligent assistant acquires content of the game; the user sends a message with the terminal in the afternoon, and the intelligent assistant acquires content of the message; and the user watches a movie with the terminal in the evening, and the intelligent assistant acquires content of the movie. The intelligent assistant is configured to record and learn a using habit of the user, predict a service to be called by the user according to the using habit of the user, and actively provide the predicted service to a system-level application of the user.

Figure 2B:
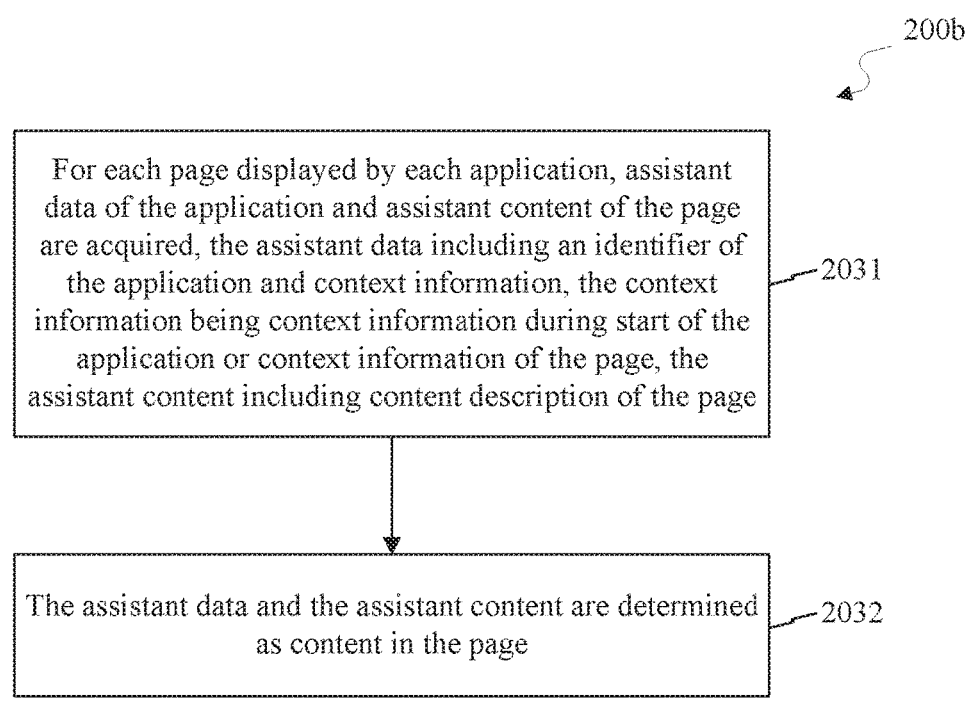
FIG. 2B is a flow chart of a method for content acquisition according to an exemplary embodiment.

FIG. 2B is a flow chart of a method 200b for content acquisition, according to an exemplary embodiment. The method 200b may be applied in step 203. Referring to FIG. 2B, the method 200b includes the following steps.

In step 2031, for each page displayed by each application, assistant data of the application and assistant content of the page are acquired. The assistant data includes an identifier of the application and context information. The context information may be context information during start of the application or context information of the page. The assistant content includes content description of the page. In one embodiment, the assistant data and the assistant content are provided by a developer of the application.

In exemplary embodiments, the context information includes a class name. If the assistant data is obtained when the application is started, the context information is the context information during start of the application, and the class name is a class name of the application. If the assistant data is obtained according to the page displayed by the application after the application is started, the context information is the context information of the page, and the class name is a class name of the page. The assistant data may be, for example, AssistData, and in this case, a type of the assistant data is Bundle.

In exemplary embodiments, the assistant content includes content description of the page. The content description may include, but is not limited to, a title, a text or the like. The assistant content may be, for example AssistContent, and in this case, a data format of the assistant content follows a standard defined on schema.org.

For example, when the user opens an application, the intelligent assistant may call an onProvideAssistData interface of the application to notify an Android system of reading AssistData provided by an application developer. In a process of using the application, when the user opens each activity (i.e., page) of the application, the intelligent assistant may call the onProvideAssistData interface and an onProvideAssistContent interface. The intelligent assistant calls the onProvideAssistData interface to notify the Android system of reading the AssistData provided by the application developer, and the AssistData includes an identifier of the application and context information configured to describe the activity where the user is viewing. The intelligent assistant calls the onProvideAssistContent interface to notify the Android system of reading AssistContent provided by the application developer.

In step 2032, the assistant data and the assistant content are determined as the content in the page.

Figure 2C:
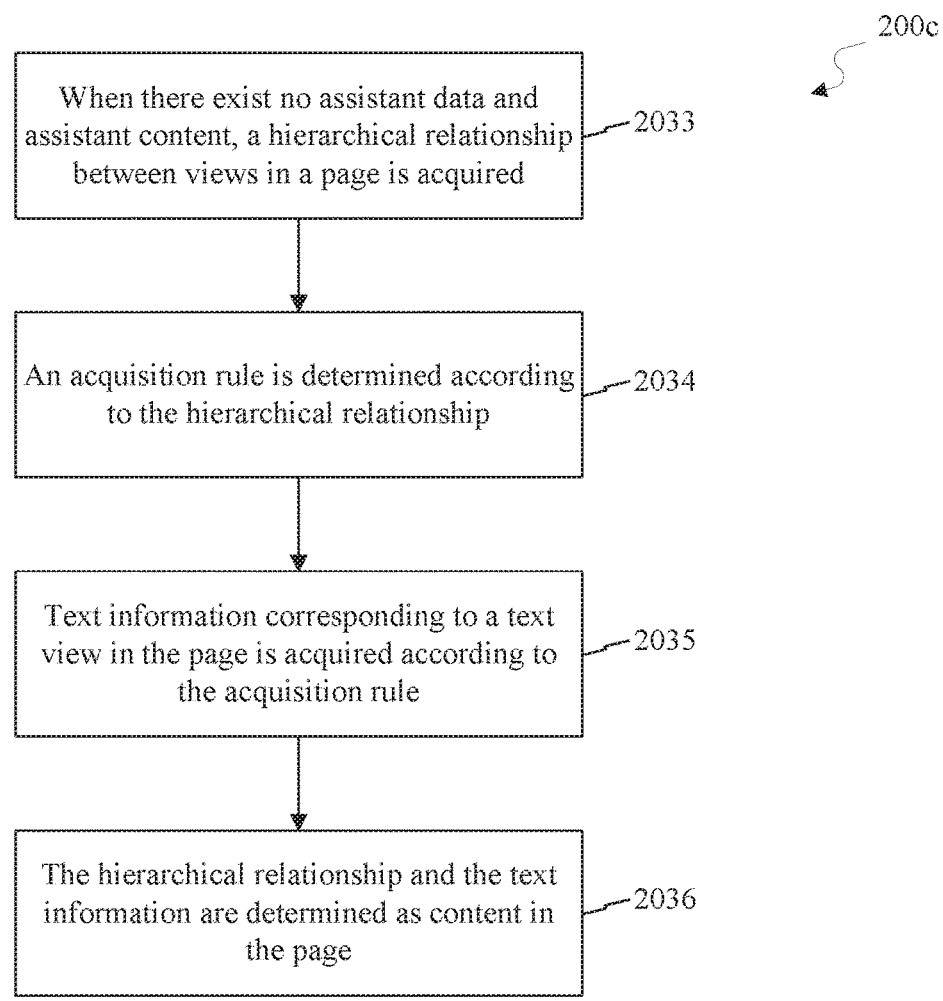
FIG. 2C is a flow chart of a method for content acquisition according to another exemplary embodiment.

When the application developer does not provide the assistant data and the assistant content, the intelligent assistant extracts the content from the page. In this case, steps 2033-2036 shown in FIG. 2C are executed. FIG. 2C is a flow chart of a method 200c for content acquisition according to another embodiment. When the intelligent assistant has acquired the content, step 204 of the method 200a is executed.

Referring to FIG. 2C, the method 200c includes the following steps.

In step 2033, when no assistant data or assistant content exists, a hierarchical relationship between views in the page is acquired. For example, the views may be views in the activity, and the hierarchical relationship may be WindowNode.

The hierarchical relationship between the views includes a hierarchical relationship displayed in the page and a hierarchical relationship not displayed in the page. The intelligent assistant may call an onProvideStructure interface to notify the Android system of acquiring the hierarchical relationship displayed in WindowNode and call an onProvideVirtualStructure interface to notify the Android system of acquiring the hierarchical relationship not displayed in WindowNode. Main content of WindowNode is the hierarchical relationship between the views in the activity.

In step 2034, an acquisition rule is determined according to the hierarchical relationship.

Different hierarchical relationships correspond to different acquisition rules. For example, when a hierarchical relationship of a microblog application is determined according to the hierarchical relationship between the views, the acquisition rule is determined to be acquiring a few latest-posted blog articles in the page.

In step 2035, text information corresponding to a text view in the page is acquired according to the acquisition rule.

The text information may be text information corresponding to TextView in the activity. The intelligent assistant calls a createAccessibilityNodeInfo interface to notify the system of acquiring ViewNode. Main content of the ViewNode is the text information corresponding to TextView in the application.

In step 2036, the hierarchical relationship and the text information are determined as the content in the page.

The Android system calls back an onHandleAssist interface to transmit the acquired content to the intelligent assistant. The intelligent assistant may extract a keyword from the data, and then executes step 208 of the method 200a. In this case, the content may be AssistData and AssistContent, and may also be ViewNode and WindowNode.

In the exemplary embodiment, an activity mechanism of the Android system is modified to make the onProvideStructure interface, the onProvideVirtualStructure interface and the createAccessibilityNodeInfo interface not called when a home button of the terminal is pressed for a long period of time, as in related technologies, but called in the process of acquiring the abovementioned content. As a result, content acquisition is realized with no influence on normal running of the activity mechanism of the Android system.

Referring back to FIG. 2A, in step 204, indexes are created according to the contents in all pages displayed by each application, to obtain an index list.

In some embodiments, since the contents in the pages displayed by each application in the terminal may reflect a using habit of the user, the intelligent assistant may generate the indexes according to the contents. For example, the intelligent assistant may generate an index for contents in all pages displayed by an application. In this case, the index includes at least an identifier of the application, a time when each content is acquired, a title of each content, a description about each content, a link to the pages to which each content belongs are started, class names or the like.

For example, when the application is a rideshare application, the user may initiate an operation of riding a taxi to home in the rideshare application at 9:00 pm on Monday. Content obtained by the intelligent assistant includes an identifier of the rideshare application, 9:00 pm, riding a taxi to home, a start location, a destination location, an icon of the rideshare application, a link to a page started for riding a taxi to home, and a class name. The user may also initiate an operation of riding a taxi to home in the rideshare application at 10:00 pm on Tuesday. In this case, content obtained by the intelligent assistant includes the identifier of the rideshare application, 10:00 pm, riding a taxi to home, a start location, the destination location, the icon of the rideshare application, the link to the page started for riding a taxi to home, and the class name. Then, an index generated by the intelligent assistant for the rideshare application includes the identifier of the rideshare application, (9:00 pm, 10:00 pm), riding a taxi to home, the start location, the destination location, the icon of the rideshare application, the link to the page started for riding a taxi to home, and the class name.

When the index is generated, the intelligent assistant may pre-process data of each content and perform data binning according to a predefined interval provided by a background server, to achieve a noise reduction effect. The pre-processing may refer to removing duplicated data. The intelligent assistant stores the pre-processed data in a local database, for example a sqlite database. Data in the local sqlite database is asynchronously processed through a Jobscehduler interface provided by the Android system. The processing may refer to finally determining the corresponding index according to an IF-THEN classification rule in a data mining method and adding the data into the index.

Steps 203-204 may be required to be executed before step 205, and an execution order of steps 203-204 and steps 201 and 202 is not limited in the exemplary embodiment.

In step 205, the index list stored in the terminal is read. Indexes in the index list are created according to the contents in the pages displayed by each application in the terminal.

In step 206, it is detected whether there exists an index in the index list that matches the parameter.

The intelligent assistant may compare the parameter with text information in the index such as the times, the locations, the titles and the descriptions. When there exists an index in which the text information includes the parameter, the index is determined as the index matching the parameter, and step 207 is executed; and when there exists no index in which the text information includes the parameter, it is determined that there exists no index matching the content, and the method 200a is ended.

For example, when the parameter is 9:00 pm, the intelligent assistant may search the index list for an index in which the time matches 9:00 pm. When there exists an index in which the time is 8:30-9:30 pm, it is determined that the index matches the parameter.

In step 207, when there exists the index in the index list that matches the parameter, a service corresponding to the index is determined.

The intelligent assistant may acquire information in the index and determine the service corresponding to the index. For example, when a theme of the index is a movie, it is determined that the service corresponding to the index is purchasing a movie ticket; when the theme of the index is taking a taxi, it is determined that the service corresponding to the index is taking a taxi; when the theme of the index is a restaurant, it is determined that the service corresponding to the index is group-buying of food or a navigation route to the restaurant; and when the theme of the index is an express delivery, it is determined that the service corresponding to the index is querying express delivery information.

In some embodiments, when an index includes multiple pieces of information of the same type with the parameter, the intelligent assistant may also detect whether the amount of the information of the same type and matching the parameter reaches a preset threshold value. When the amount reaches the preset threshold value, it indicates that the user may frequently behave like this, and the service corresponding to the index is determined; and when the amount does not reach the preset threshold value, it indicates that the user may occasionally behave like this, and the method 200a is ended. For example, the user takes a taxi at 9:00 pm on Monday through the rideshare application, takes a taxi at 9:00 pm on Tuesday through the rideshare application, and takes a taxi at 9:00 pm on Wednesday through the rideshare application, then the index corresponding to the rideshare application includes times 9:00 pm, 9:00 pm and 9:00 pm. When the parameter is time and the current time is 9:00 pm, the intelligent assistant determines that the index corresponding to the ridesharing application matches the parameter, and the amount of the information matching the parameter is 3, larger than a preset threshold value 2. Thus, the service corresponding to the index at this moment is to take a taxi.

In step 208, it is detected whether there exists a tag corresponding to the service in the preset desktop page step 209 is executed when there exists the tag corresponding to the service in the preset desktop page, and step 210 is executed when there exists no tag corresponding to the service in the preset desktop page.

In some embodiments, the intelligent assistant may also create tags in the preset desktop page and display information of each service in each corresponding tag, thereby classifying and displaying the service information of each service through the corresponding tag for the user to view and process.

Before the information of the service is displayed in the tag, the intelligent assistant may also be required to detect whether there exists the tag corresponding to the service in the preset desktop page. For example, a relationship between an identifier of a service and an identifier of a tag is pre-stored in the terminal, or, a relationship between an identifier of an application corresponding to a service and an identifier of a tag is pre-stored in the terminal. The intelligent assistant determines an identifier of the tag according to the service, and detects whether the tags displayed in the preset desktop page include the tag corresponding to the identifier of the tag.

In some embodiments, services of applications of a same type correspond to a same tag. For example, services of shopping applications correspond to a tag 1, services of mail applications correspond to a tag 2, and services of express delivery applications correspond to a tag 3.

In step 209, information of the service is displayed in the tag.

For example, if the content acquired by the intelligent assistant is express delivery information, the express delivery information is displayed in a tag corresponding to an express delivery in the preset desktop page. If the content acquired by the intelligent assistant is movie information, and the movie information is displayed in a tag corresponding to a movie in the preset desktop page.

In step 210, a tag is created, and the information of the service is displayed in the created tag.

In some embodiments, the intelligent assistant may also perform statistics on a number of identifiers of applications included in the index list and display the identifiers of the applications having relatively larger numbers in tags of frequently used applications.

Figure 2D:
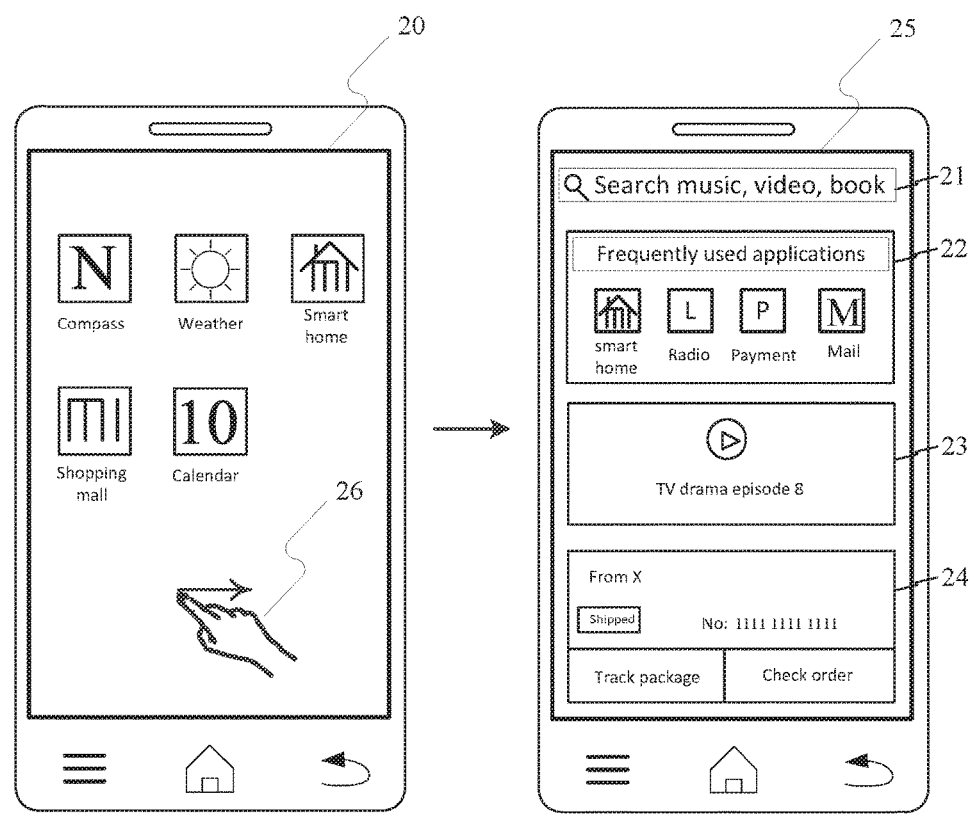
FIG. 2D is a schematic diagram of a preset desktop page according to an exemplary embodiment.

Referring to FIG. 2D, an ordinary desktop page 20 located on a right side of a preset desktop page 25 is displayed. When the user executes a rightward swipe operation 26, the preset desktop page 25 is displayed. In the preset desktop page 25, a tag 21 is configured to display a search box, a tag 22 is configured to display frequently used applications, a tag 23 is configured to display television drama information, and a tag 24 is configured to display express delivery information.

For example, in a scenario, a user in an office uses a rideshare application to ride a taxi home between 9:00 pm-10:00 pm every day. The intelligent assistant records such a behavior of the user every time when the user rides a taxi home by using the rideshare application. After a period of time, the intelligent assistant concludes that the user may use the rideshare application in the vicinity of the office between 9:00 pm-10:00 pm every day, and accordingly displays a tag of riding a taxi home by using the rideshare application on the preset desktop page. When the user clicks on the tag, the intelligent assistant directly starts the rideshare application, and triggers an operation of riding a taxi home.

In the above described methods, the preset operation configured to instruct the terminal to display the preset desktop page is received; the parameter of the environment in which the terminal is located is acquired; the service to be called by the user is predicted according to the parameter; and the information of the service is displayed in the preset desktop page. In this way, a service that may be called by a user is recommended to the user according to the using habit of the user. Therefore, the situation that a same service is continuously and forcedly recommended to the user according to a using frequency of the same service may be avoided. Accordingly, recommendation inaccuracy of a service may be reduced. Such inaccuracy may result from the same service being continuously recommended to the user according to the using frequency of the same service, while the user may call different service at different times. Thus, improving accuracy of the recommended service is achieved. Further, tags are created in the preset desktop page, and the information of each service is displayed in each tag. Thus, the service information of each service may be classified and displayed through the tags for the user to view and process.

Figure 3:
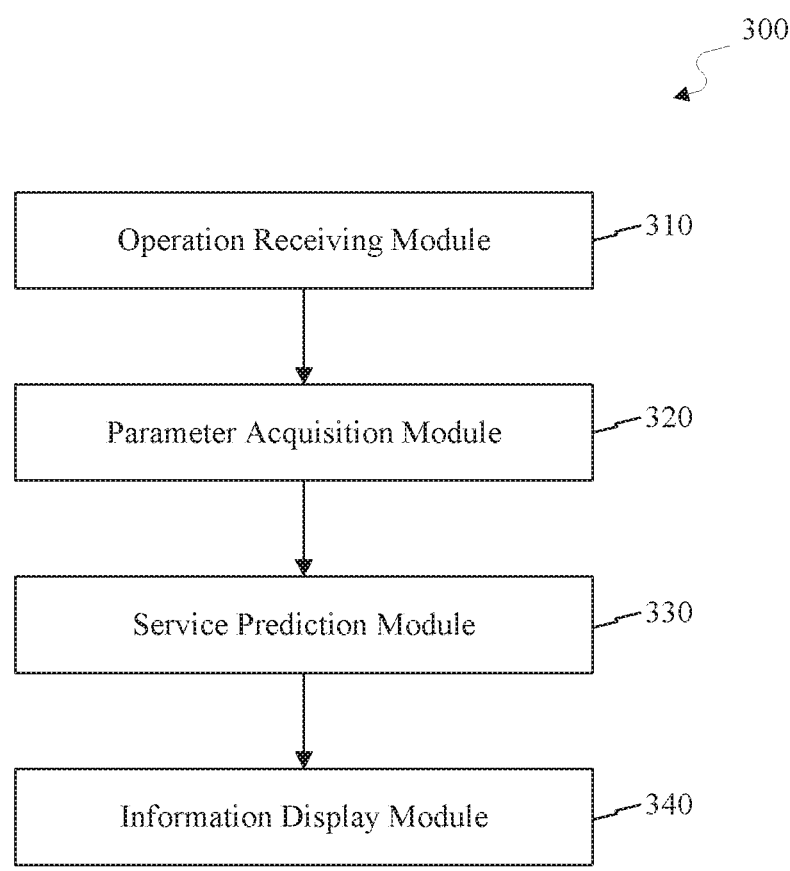
FIG. 3 is a block diagram of a device for information display according to an exemplary embodiment.

FIG. 3 is a block diagram of a device 300 for information display according to an exemplary embodiment. The device 300 may be applied to a terminal. Referring to FIG. 3, the device 300 includes an operation receiving module 310, a parameter acquisition module 320, a service prediction module 330, and an information display module 340.

The operation receiving module 310 is configured to receive a preset operation. The preset operation is configured to instruct the terminal to display a preset desktop page.

The parameter acquisition module 320 is configured to acquire a parameter of an environment in which the terminal is located.

The service prediction module 330 is configured to predict a service to be called by a user according to the parameter acquired by the parameter acquisition module 320.

The information display module 340 is configured to display information of the service predicted by the service prediction module 330 in the preset desktop page.

According to the device 300, the preset operation configured to instruct the terminal to display the preset desktop page is received; the parameter of the environment where the terminal is located is acquired; the service to be called by the user is predicted according to the parameter; and the information of the service is displayed in the preset desktop page. In this way, a service that may be called by a user is recommended to the user according to usage habits of the user. Therefore, the situation that a same service is continuously and forcedly recommended to the user according to a using frequency of the same service may be avoided. Accordingly, recommendation inaccuracy of a service is reduced. Such inaccuracy may result from the same service being continuously recommended to the user according to the using frequency of the same service, while the user may call different service at different times. Thus, improving accuracy of the recommended service is achieved.

Figure 4:
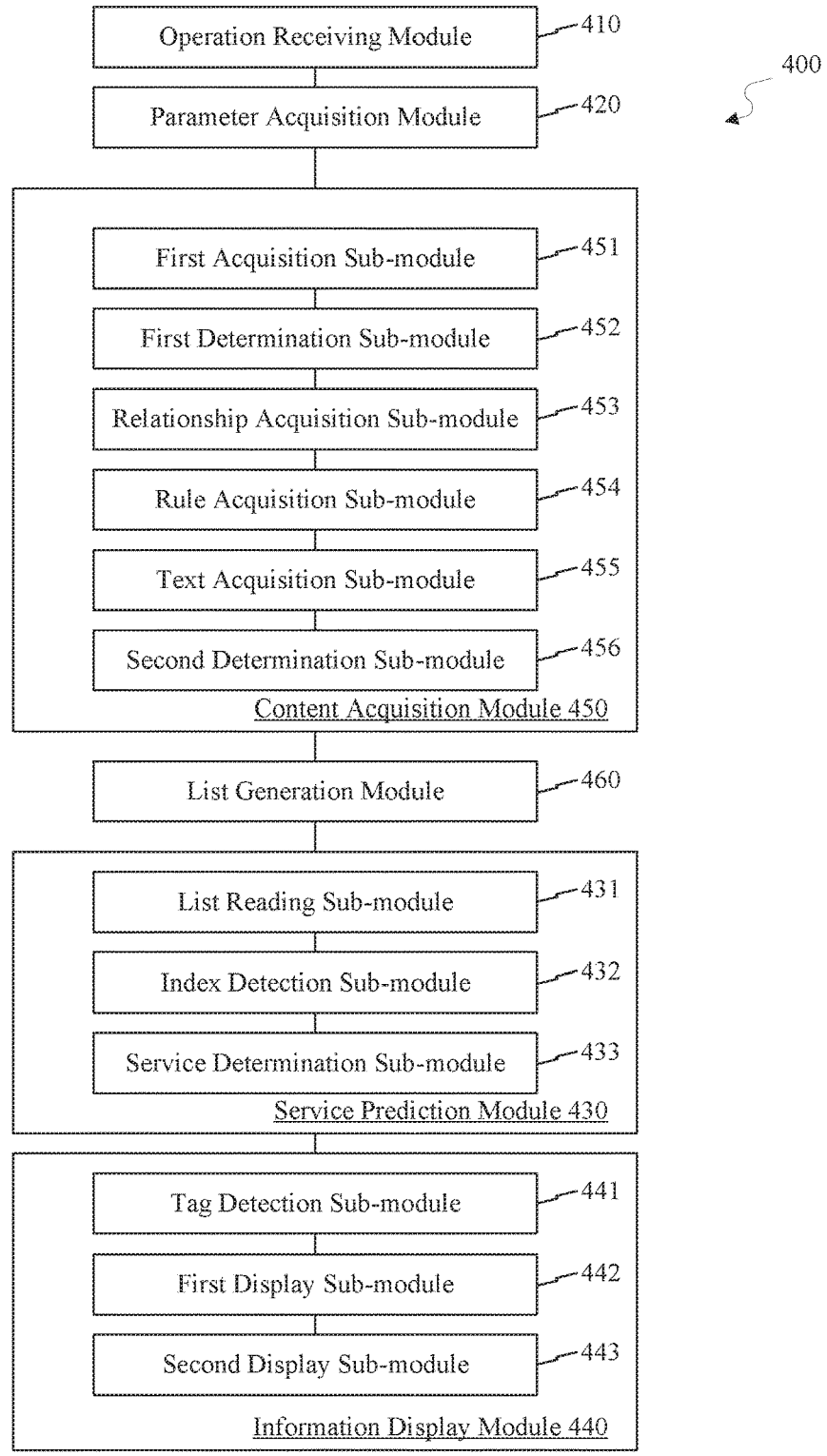
FIG. 4 is a block diagram of a device for information display according to another exemplary embodiment.

FIG. 4 is a block diagram of a device 400 for information display according to another exemplary embodiment. The device 400 may be applied to a terminal. Referring to FIG. 4, the device 400 includes an operation receiving module 410, a parameter acquisition module 420, a service prediction module 430 and an information display module 440.

The operation receiving module 410 is configured to receive a preset operation. The preset operation is configured to instruct the terminal to display a preset desktop page.

The parameter acquisition module 420 is configured to acquire a parameter of an environment in which the terminal is located.

The service prediction module 430 is configured to predict a service to be called by a user according to the parameter obtained by the parameter acquisition module 420.

The information display module 440 is configured to display information of the service predicted by the service prediction module 430 in the preset desktop page.

In some embodiments, the service prediction module 430 may include a list reading sub-module 431, an index detection sub-module 432 and a service determination sub-module 433.

The list reading sub-module 431 is configured to read an index list stored in the terminal. Indexes in the index list are created according to content in pages displayed by each application in the terminal.

The index detection sub-module 432 is configured to detect whether there exists an index matched with the parameter in the index list obtained by the list reading sub-module 431.

The service determination sub-module 433 is configured to, when the index detection sub-module 432 detects that there exists the index matched with the parameter in the index list, determine a service corresponding to the index.

In some embodiments, the device 400 may further include a content acquisition module 450 and a list generation module 460.

The content acquisition module 450 is configured to acquire the contents in the pages displayed by each application in the terminal.

The list generation module 460 is configured to create an index according to the content in all pages displayed by each application, to obtain the index list.

In some embodiments, the content acquisition module 450 includes a first acquisition sub-module 451 and a first determination sub-module 452.

The first acquisition sub-module 451 is configured to, for each page displayed by each application, acquire assistant data of the application and assistant content of the page. The assistant data includes an identifier of the application and context information. The context information is context information during start of the application or context information of the page. The assistant content includes content description of the page.

The first determination sub-module 452 is configured to determine the assistant data and assistant content acquired by the first acquisition sub-module 451 as the content in the page.

In some embodiments, the content acquisition module 450 may further includes a relationship acquisition sub-module 453, a rule acquisition sub-module 454, a text acquisition sub-module 455 and a second determination sub-module 456.

The relationship acquisition sub-module 453 is configured to, when no assistant data or assistant content exist, acquire a hierarchical relationship between views in the page.

The rule acquisition sub-module 454 is configured to determine an acquisition rule according to the hierarchical relationship acquired by the relationship acquisition sub-module 453.

The text acquisition sub-module 455 is configured to acquire text information corresponding to a text view in the page according to the acquisition rule obtained by the rule acquisition sub-module 454.

The second determination sub-module 456 is configured to determine the hierarchical relationship acquired by the relationship acquisition sub-module 453 and the text information acquired by the text acquisition sub-module 455 as the content in the page.

In some embodiments, the information display module 440 may include a tag detection sub-module 441, a first display sub-module 442 and a second display sub-module 443.

The tag detection sub-module 441 is configured to detect whether there exists a tag corresponding to the service in the preset desktop page.

The first display sub-module 442 is configured to, when the tag detection sub-module 441 detects that there exists the tag corresponding to the service in the preset desktop page, display the information of the service in the tag.

The second display sub-module 443 is configured to, when the tag detection sub-module 441 detects that there exists no tag corresponding to the service in the preset desktop page, create a tag, and display the information of the service in the created tag.

According to device 400, the preset operation configured to instruct the terminal to display the preset desktop page is received; the parameter of the environment where the terminal is located is acquired; the service to be called by the user is predicted according to the parameter; and the information of the service is displayed in the preset desktop page. In this way, a service that may be called by a user is recommended to the user according to usage habits of the user. Therefore, the situation that a same service is continuously and forcedly recommended to the user according to a using frequency of the same service may be avoided. Accordingly, recommendation inaccuracy of a service may be reduced. Such inaccuracy may result from that a same service is continuously recommended to the user according to the using frequency of the same service, while the user may call different services at different times. Thus, improving accuracy of the recommended service is achieved. Further, tags are created in the preset desktop page, and information of each service is displayed in each tag. As such, the service information of each service may be classified and displayed through the tags for the user to view and process.

With respect to the devices in the above exemplary embodiments, the specific manners for performing operations by individual modules therein have been described in detail in the exemplary embodiments regarding the methods, which will not be repeated herein.

An exemplary embodiment of the present disclosure provides a device which may implement a method for information display provided by the present disclosure. The device may include a processor and a memory configured to store instructions executable by the processor. The processor is configured to receive a preset operation, the preset operation being configured to instruct a terminal to display a preset desktop page. The processor is further configured to acquire a parameter of an environment in which the terminal is located; to predict service to be called by a user according to the parameter; and to display information of the service in the preset desktop page.

Figure 5:
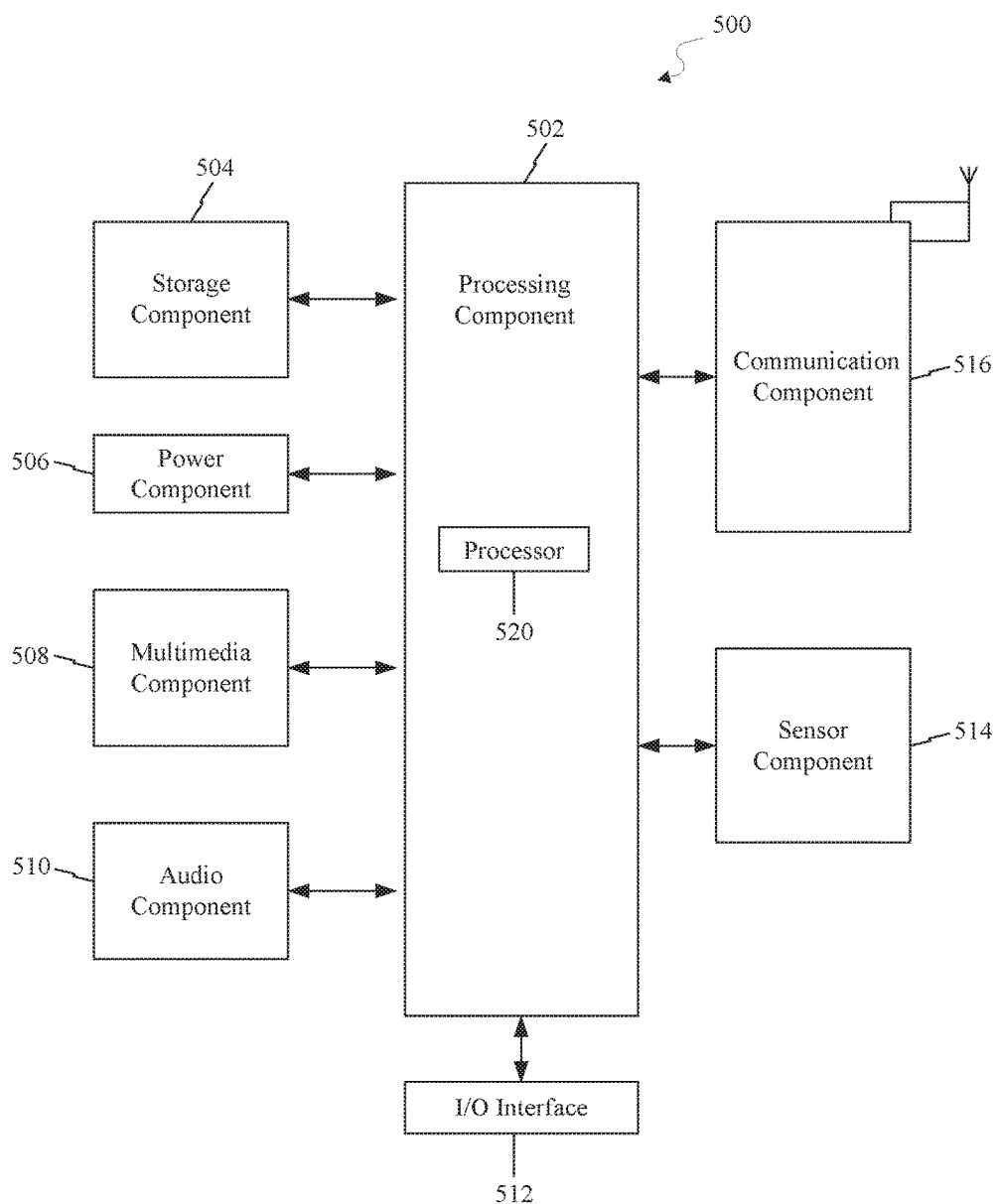
FIG. 5 is a block diagram of a device for information display according to yet another exemplary embodiment.

FIG. 5 is a block diagram a device 500 for information display according to an exemplary embodiment. For example, the device 500 may be a terminal such as a mobile phone, a computer, a digital broadcast terminal, a messaging device, a gaming console, a tablet, a medical device, exercise equipment, a personal digital assistant or the like.

Referring to FIG. 5, the device 500 may include one or more of the following components: a processing component 502, a storage component 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the abovementioned method. Moreover, the processing component 502 may include one or more modules which facilitate interactions between the processing component 502 and the other components. For instance, the processing component 502 may include a multimedia module to facilitate interactions between the multimedia component 508 and the processing component 502.

The storage component 504 is configured to store various types of data to support the operation of the device 500. Examples of such data include instructions for any application programs or methods operated on the device 500, contact data, phonebook data, messages, pictures, video, etc. The storage component 504 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 506 provides power for various components of the device 500. The power component 506 may include a power management system, one or more power supplies, and other components associated with the generation, management and distribution of power for the device 500.

The multimedia component 508 includes a screen providing an output interface between the device 500 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a microphone (MIC) configured to receive an external audio signal when the device 500 is in the operation mode, such as a call mode, a recording mode and a voice recognition mode. The received audio signal may be further stored in the storage component 504 or sent through the communication component 516. In some embodiments, the audio component 510 further includes a speaker configured to output the audio signal.

The I/O interface 512 provides an interface between the processing component 502 and a peripheral interface module, and the peripheral interface module may be a keyboard, a click wheel, a button or the like. The button may include, but not limited to: a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a complementary metal oxide semiconductor (CMOS) or charge coupled device (CCD) image sensor, configured for use in an imaging application. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and another device. The device 500 may access a communication-standard-based wireless network, such as a Wireless Fidelity (WiFi) network, a 2nd-Generation (2G), 3rd-Generation (3G), or 4th-Generation (4G) network or a combination thereof. In an exemplary embodiment, the communication component 516 receives a broadcast signal or broadcast associated information from an external broadcast management system through a broadcast channel. In an exemplary embodiment, the communication component 516 further includes a near dield communication (NFC) module to facilitate short-range communication. For example, the NFC module may be implemented on the basis of a radio frequency identification (RFID) technology, an infrared data association (IrDA) technology, an ultra-wideband (UWB) technology, a Bluetooth (BT) technology and another technology.

In an exemplary embodiment, the device 500 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium having instructions stored thereon, such as the storage component 504 including instructions. The instructions may be executed by the processor 520 of the device 500 to implement the above described methods. For example, the non-transitory computer-readable storage medium may be a ROM, a radom access memory (RAM), a compact disc read-only memory (CD-ROM), a magnetic tape, a floppy disc, an optical data storage device or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for information display, comprising:
    receiving a preset operation, the preset operation being configured to instruct a terminal to display a preset desktop page;
    acquiring a parameter of an environment in which the terminal is located;
    predicting a service to be called by a user according to the parameter;
    detecting whether there exists a tag corresponding to the service in the preset desktop page or not, wherein a relationship between an identifier of a service and an identifier of a tag is pre-stored in the terminal;
    when there exists the tag corresponding to the service in the preset desktop page, displaying the information of the service in the tag;
    when there exists no tag corresponding to the service in the preset desktop page, creating a tag, and displaying the information of the service in the created tag;
    performing statistics on a number of identifiers of applications included in an index list stored in the terminal; and
    displaying the identifiers of the applications having relatively larger numbers in tags of frequently used applications.

2. The method according to claim 1, wherein predicting the service to be called by the user according to the parameter comprises:
    reading the index list, indexes in the index list being created according to contents in pages displayed by applications in the terminal;
    detecting whether there exists an index in the index list matching the parameter; and
    when there exists the index in the index list matching the parameter, determining the service corresponding to the index.

3. The method according to claim 2, further comprising:
    acquiring the contents in the pages displayed by the applications in the terminal; and
    creating the indexes according to the contents in the pages displayed by the applications, to obtain the index list, wherein when the index is generated, duplicated data among data of the content in all pages displayed by each application is removed, and data binning is performed according to a predefined interval provided by a background server, to achieve a noise reduction effect.

4. The method according to claim 3, wherein acquiring the contents in the pages displayed by the applications in the terminal comprises:
    for each page displayed by each application, acquiring assistant data of the application and assistant content of the page provided by a developer of the each application, the assistant data including an identifier of the application and context information, the context information including context information during start of the application and a class name of the each application, and the assistant content including content description of the page; and
    determining the assistant data and the assistant content as the content in the page.

5. The method according to claim 4, further comprising:
    when no assistant data or assistant content exist, acquiring a hierarchical relationship between views in the page, wherein the hierarchical relationship between the views in the page includes a hierarchical relationship displayed in the page and a hierarchical relationship not displayed in the page;
    determining an acquisition rule according to the hierarchical relationship between the views in the page;
    acquiring text information corresponding to a text view in the page according to the acquisition rule; and
    determining the hierarchical relationship between the views in the page and the text information as the content in the page.

6. The method according to claim 3, further comprising:
    storing the data, of which the duplicated data is removed, in a local database;
    asynchronously processing the data in the local database according to an IF-THEN classification rule in a data mining method through a first interface provided by an Android system; and
    determining a corresponding index and adding the data in the local database into the corresponding index.

7. The method according to claim 5, wherein the views are views in the activity, and the hierarchical relationship between the views in the page is a WindowNode, of which main content is the hierarchical relationship between the views in the activity, the acquiring a hierarchical relationship between views in the page comprises:
    calling a second interface to notify an Android system of acquiring the hierarchical relationship displayed in the WindowNode, and
    calling a third interface to notify the Android system of acquiring the hierarchical relationship not displayed in the WindowNode.

8. The method according to claim 5, wherein the text information is text information corresponding to TextView in the activity, the acquiring text information corresponding to a text view in the page according to the acquisition rule comprises:
    calling a forth interface to notify an Android system of acquiring ViewNode, of which main content is the text information corresponding to the TextView in the application.

9. A terminal, comprising:
a processor; and
a memory configured to store instructions executable by the processor,
wherein the processor is configured to:
  receive a preset operation, the preset operation being configured to instruct the terminal to display a preset desktop page;
  acquire a parameter of an environment in which the terminal is located;
  predict a service to be called by a user according to the parameter;
  detect whether there exists a tag corresponding to the service in the preset desktop page or not, wherein a relationship between an identifier of a service and an identifier of a tag is pre-stored in the terminal;
  when there exists the tag corresponding to the service in the preset desktop page, display the information of the service in the tag;
  when there exists no tag corresponding to the service in the preset desktop page, create a tag, and display the information of the service in the created tag;
  perform statistics on a number of identifiers of applications included in an index list stored in the terminal; and
  display the identifiers of the applications having relatively larger numbers in tags of frequently used applications.

10. The terminal according to claim 9, wherein the processor is further configured to:
  read the index list, indexes in the index list being created according to contents in pages displayed by applications in the terminal;
  detect whether there exists an index in the index list matching the parameter; and
  when there exists the index in the index list matching the parameter, determine the service corresponding to the index.

11. The terminal according to claim 10, wherein the processor is further configured to:
  acquire the contents in the pages displayed by the applications in the terminal; and
  create the indexes according to the contents in the pages displayed by the applications, to obtain the index list, wherein when the index is generated, duplicated data among data of the content in all pages displayed by each application is removed, and data binning is performed according to a predefined interval provided by a background server, to achieve a noise reduction effect.

12. The terminal according to claim 11, wherein the processor is further configured to:
  for each page displayed by each application, acquire assistant data of the application and assistant content of the page provided by a developer of the each application, the assistant data including an identifier of the application and context information, the context information including context information during start of the application and a class name of the each application, and the assistant content including content description of the page; and
  determine the assistant data and assistant content as the content in the page.

13. The terminal according to claim 12, wherein the processor is further configured to:
  when no assistant data or assistant content exist, acquire a hierarchical relationship between views in the page, wherein the hierarchical relationship between the views in the page includes a hierarchical relationship displayed in the page and a hierarchical relationship not displayed in the page;
  determine an acquisition rule according to the hierarchical relationship between the views in the page;
  acquire text information corresponding to a text view in the page according to the acquisition rule; and
  determine the hierarchical relationship between the views in the page and the text information as the content in the page.

14. A non-transitory computer-readable storage medium having stored therein instructions that, when executed by a processor of a terminal, cause the terminal to perform a method for information display, the method comprising:
  receiving a preset operation, the preset operation being configured to instruct the terminal to display a preset desktop page;
  acquiring a parameter of an environment in which the terminal is located;
  predicting a service to be called by a user according to the parameter;
  detecting whether there exists a tag corresponding to the service in the preset desktop page or not, wherein a relationship between an identifier of a service and an identifier of a tag is pre-stored in the terminal;
  when there exists the tag corresponding to the service in the preset desktop page, displaying the information of the service in the tag;
  when there exists no tag corresponding to the service in the preset desktop page, creating a tag, and displaying the information of the service in the created tag;
  performing statistics on a number of identifiers of applications included in an index list stored in the terminal; and
  displaying the identifiers of the applications having relatively larger numbers in tags of frequently used applications.

15. The non-transitory computer-readable storage medium according to claim 14, wherein predicting the service to be called by the user according to the parameter comprises:
  reading the index list, indexes in the index list being created according to contents in pages displayed by applications in the terminal;
  detecting whether there exists an index in the index list matching the parameter; and
  when there exists the index in the index list matching the parameter, determining the service corresponding to the index.

16. The non-transitory computer-readable storage medium according to claim 15, wherein the method further comprises:
  acquiring the contents in the pages displayed by the applications in the terminal; and
  creating the indexes according to the contents in the pages displayed by the applications, to obtain the index list, wherein when the index is generated, duplicated data among data of the content in all pages displayed by each application is removed, and data binning is performed according to a predefined interval provided by a background server, to achieve a noise reduction effect.

17. The non-transitory computer-readable storage medium according to claim 16, wherein acquiring the contents in the pages displayed by the applications in the terminal comprises:

for each page displayed by each application, acquiring assistant data of the application and assistant content of the page provided by a developer of the each application, the assistant data including an identifier of the application and context information, the context information including context information during start of the application and a class name of the each application, and the assistant content including content description of the page; and determining the assistant data and the assistant content as the content in the page.

18. The non-transitory computer-readable storage medium according to claim 17, wherein the method further comprises:

when no assistant data or assistant content exist, acquiring a hierarchical relationship between views in the page, wherein the hierarchical relationship between the views in the page includes a hierarchical relationship displayed in the page and a hierarchical relationship not displayed in the page;

determining an acquisition rule according to the hierarchical relationship between the views in the page;

acquiring text information corresponding to a text view in the page according to the acquisition rule; and determining the hierarchical relationship between the views in the page and the text information as the content in the page.

* * * * *